United States Patent [19]
Walters

[11] 3,710,330
[45] Jan. 9, 1973

[54] SCALED SCAN CONTROL SYSTEM FOR CONFORMAL ARRAYS

[76] Inventor: Glenn A. Walters, 12900 Camino Del Valle, Poway, Calif. 92064

[22] Filed: Oct. 14, 1970

[21] Appl. No.: 80,670

[52] U.S. Cl. ............................343/100 SA, 340/6 R
[51] Int. Cl. ................................................H01q 3/26
[58] Field of Search.....................343/100 SA; 340/6

[56] References Cited

UNITED STATES PATENTS 2,898,589   8/1959   Abbott.....................343/100 SA UX

*Primary Examiner*—Benjamin A. Borchelt
*Assistant Examiner*—Richard E. Berger

[57] ABSTRACT

The radiation pattern of a conformal, quasi-uniform distribution of elements, each containing a radiating aperture, mixer and possible other active and passive components, is controlled by controlling the phase-amplitude characteristics of signals applied to the elemental mixers. The phase-amplitude characteristics of the control signals are derived from a scaled array wherein individual elements are arranged in accordance with those of the operational conformal array. The scaled system is illuminated by an electromagnetic or acoustic beam having the desired radiation pattern and the characteristics of the elemental signal within the elements of the scaled array control the radiation pattern of the conformal array in the desired manner.

9 Claims, 3 Drawing Figures

PATENTED JAN 9 1973

INVENTOR.

BY Glenn A. Walters

SCALED SCAN CONTROL SYSTEM FOR CONFORMAL ARRAYS

It is often desirable to have a radiation system conform to an aerodynamical, hydrodynamical or some other predetermined surface. A beam of energy, ex, electromagnetic or acoustical, can be formed and directed from an arbitrary array of elements by properly controlling the amplitude-phase relationship of signals transmitted to and from each element. The complexity of the conformal shape configuration, the number of elements involved, requirements for beam scanning, bandwidth considerations and other factors make it difficult to define and control the elemental signals. Accordingly, it is the primary object of the present invention to provide a practical and versitle scan control system for a conformal array.

In its fundamental form the concept of the present invention provides a scaled scan control system to provide individual control signals that inherently have the proper amplitude-phase characteristics to similarly control, through appropriate mixing of signals with a common reference signal, signals of corresponding elements within the secondary, or operational, conformal array. In this way the secondary radiation pattern has radiation characteristics and an angular orientation in correspondence with the pattern characteristics and angular orientation of the control radiating aperture within the scaled scan control system.

The basic system consists of the full scale array with elements arranged in a quasi-uniform distribution, usually three dimensional, over the surface of interest. Each element, as a minimum, consists of a radiating aperture and mixer. In addition, it usually contains filters and can include amplifiers and switches. The purpose of these latter components is to reduce signal reception or radiation at unwanted frequencies, increase transmit power or receiver sensitivity and to switch from a transmit to receive mode.

A mixer is a non-linear device in which both the sum and difference frequencies of the applied signals along with higher order components of all combinations of the frequency components involved are generated. Signals involved are:

$e_c = E_c \cos(\omega_c + \phi)$ $e_r = E_r \cos \omega_r$ $i_0 = a_1(e_c + e_r) + a_2(e_c + e_r)^2 + \ldots a_n(e_c + e_r)^n$ where $e_c$ = input control signal voltage
$e_r$ = input reference signal voltage
$i_o$ = output signal current
$E_c$ = control signal--maximum voltage
$E_r$ = reference signal--maximum voltage
$\omega_c = 2\pi f_c$ where $f_c$ = control signal frequency
$\omega_r = 2\pi f_r$ where $f_r$ = reference signal frequency
$\phi$ = phase shift of control signal
$a_1, a_2, a_n$ = transfer constant of non-linear circuit The control and reference signals combine and generate the following components:

$i_o =$ $a_1 E_r \cos \omega_r$    reference signal
$+ a_1 E_c \cos(\omega_c + \phi)$    control signal
$+ a_2/2 [E_r 2 + E_c 2]$    DC component
$+ a_2 E_r E_c \cos[\omega_r - (\omega_c + \phi)]$    lower side frequency
$+ a_2 E_r E_c \cos[\omega_r + (\omega_c + \phi)]$    upper side frequency
$+ a_2/2 E_r^2 \cos 2\omega_r$    2nd harmonic ref. signal
$+ a_2/2 E_c 2 \cos 2(\omega_c + \phi)$    2nd harmonic con. signal
$+ a_n/2 E_r^n \cos n\omega_r$    infinitum The original phase-amplitude relationship of the input signals is retained within the higher order components. When individual control signals are applied to corresponding mixer elements along with reference signals having equal phase-amplitude characteristics at each mixer input, the relative phase-amplitude characteristics of the control signals are retained in the output signals. The requirement, therefore, is to properly control the phase-amplitude characteristics of the control signals.

In accordance with the concept of this invention a scaled or model scan control system is employed. A smaller, but accurately scaled, surface and array is formed with individual elements arranged in accordance with those of the operational conformal array. Angular disposition of scaled and operational components are made identical. This scaled, or primary, array is illuminated from a control radiating aperture, operating at a wavelength, scaled in direct accordance with the physical dimension scale employed, and having the desired radiation characteristics compatible with the available aperture, etc. Signals received by the transducers within the primary array from this control radiation aperture inherently have the proper phase-amplitude characteristics to control and direct a beam from the secondary array in correspondence with the electrical characteristics and angular orientation of the control radiating operation. Furthermore, scan motion of the control radiating aperture is duplicated by the secondary radiation pattern.

It is a further object of this invention to indicate a convenient method for scaling wavelength. While in acoustical applications it may be convenient to operate the scaled scan control system at a higher acoustic frequency than the secondary conformal array, it may be difficult to instrument this design approach in radar applications. In this latter case it may be advantageous to utilize an acoustic system for controlling the radar system wherein the basic change in velocity propagation constants provide a large scaling factor. For example, a 10 Ghz radar system has the same wavelength (3 cm) as an 11 khz acoustical system operating in air. A 10:1 scaling factor requires an operational acoustic frequency of 110 khz.

The advantages are two-fold; the instrumentation problems are reduced and the distribution of lower frequencies, without phase discrepancies, is more easily accomplished. To simplify associate filtering problems intermediate signal mixing may be employed.

It is a further object of this invention to provide a system equally capable of both transmitting and receiving. Laws of reciprocity inherently provide this feature. There are two primary methods of implementation. The signal can be received at the output from the control radiating aperture, i.e., time shared through appropriate transmit-receive switching, with the control signal oscillator. Alternately, it can be received at the output of the reference signal distribution system; i.e., time shared, through appropriate transmit-receive switching, with the reference signal oscillator. The latter has advantages where short pulse reception is required. In addition, either the reference signal or control signal can be controlled to establish the modulation characteristics of the transmitted signal in accordance with specific system requirements.

These and other objects of my invention will become apparent from the following description of exemplary embodiments thereof, reference being made to the accompanying drawings.

Figure 1:
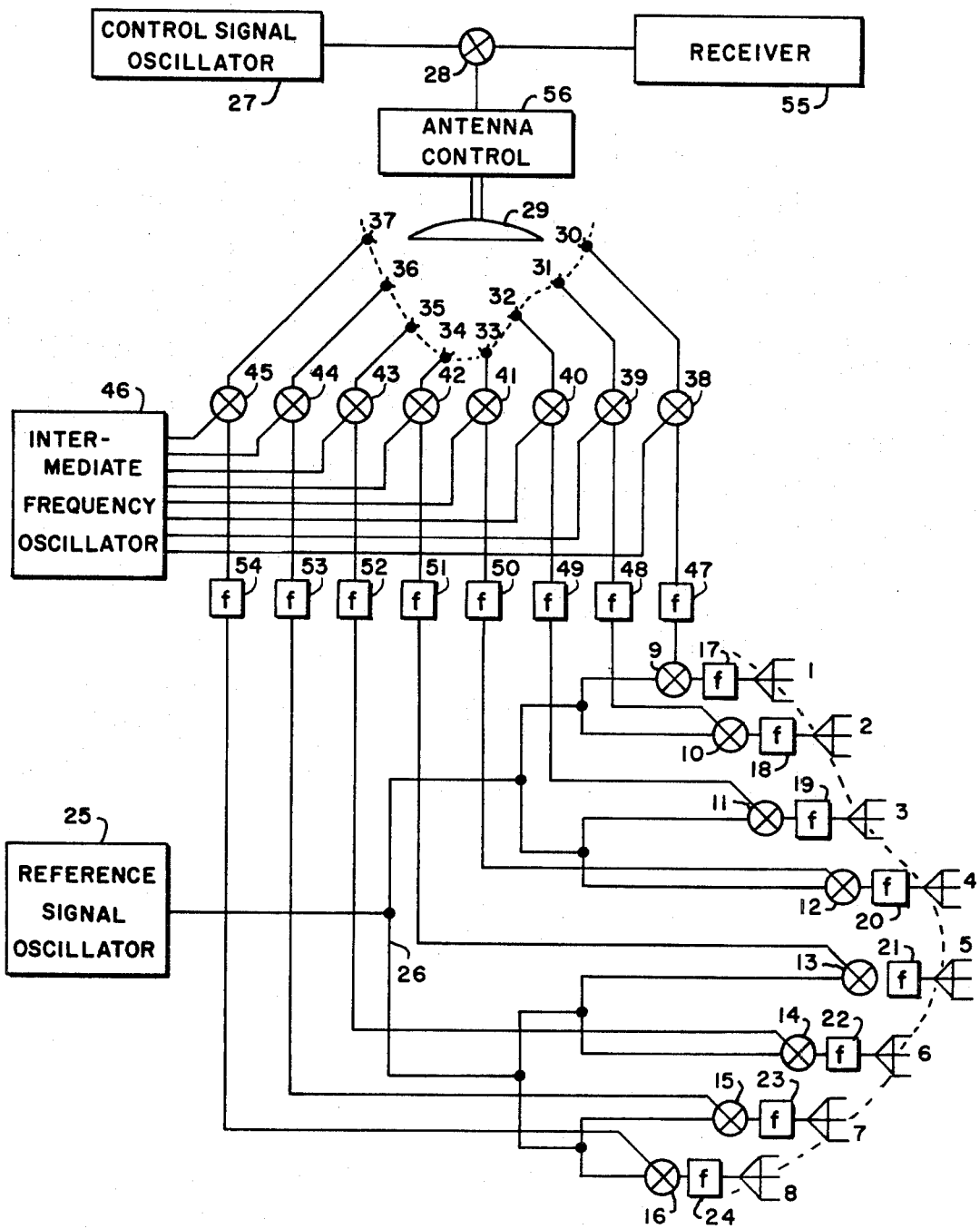
FIG. 1 is a block diagram of the scaled scan control system describing the basic elements involved.

For purpose of clarity the description of the invention shall be discussed primarily in reference to microwave application and in terms of the transmit mode. Referring to FIG. 1, radiating elements, 1 through 8, are equally spaced, typically 0.5 to 0.75 wavelengths apart, along a predetermined surface, i.e., conformal array. The radiators can be of any conventional type such as slots, dipoles, etc. and excited to produce a desired polarization characteristic. These radiating elements are fed by signals from mixers 9 through 16, and filters 17 through 24, respectively. One input signal is obtained from the reference signal oscillator 25 through a corporate transmission line assembly 26; thus arriving with equal phase and amplitude characteristics at each of the mixer input. The second input signal originates from the control signal oscillator 27 through transmit-receive switch 28 to the control radiating aperture 29, radiated to transducers 30 through 37, mixed in intermediate mixer 38 through 45 with intermediate frequency osciallator 46. The appropriate side frequency then passes through filters 47 through 54; thus arriving at mixers 9 through 16 with the phase and amplitude characteristics established by the control radiating aperture and scaled primary array. The appropriate side frequency passes through the filters 17 through 24 and is radiated in correspondance with the scan control system. In this example, consider a transmitted signal of 10 ghz with the reference signal oscillator at a frequency of 9.940 ghz, i.e., 60 mhz below the transmitted signal. The intermediate frequency is thus 60 mhz. The control signal oscillator is set at a frequency of 11 kc and utilizes acoustic radiation from the control radiating aperture to the primary transducer array. The wavelengths involved are 3 cm for the microwave frequency; 0.3 cm for the acoustical frequencies, i.e., a scaling factor of 10:1. The physical dimensions of the scaled primary array are one-tenth that of the secondary array. The electrical phase shift and amplitude characteristics of the control radiation aperture 29 are appropriately received by the primary transducer array 30–37 for frequency translations and reradiation from the secondary conformal array. The 11 KHz signal is mixed with the intermediate frequency oscillator signal, having a frequency of 59.989 Mhz, to provide, after transmission through the filters, 47 through 54, the 60 Mhz control signal.

By reciprocity, a signal at a frequency of 10 ghz entering the conformal array, elements 1 through 8, from the direction of interest will be coherently received at the output of the control radiation aperture and can be directed through transmit-receive switch 28 to the receiver 55. The direction of interest is chosen by orienting the control radiating aperture by antenna control 56.

Figure 2:
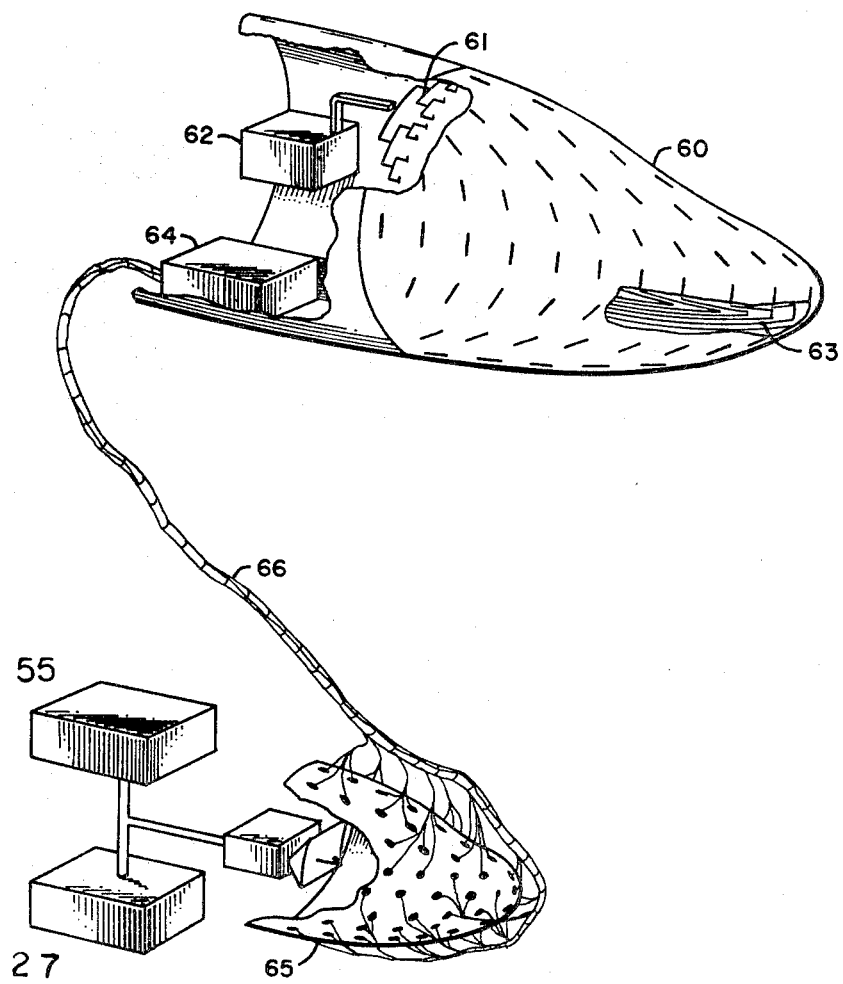
FIG. 2 is a pictorial presentation of the system.

A typical physical arrangement of the required components is shown in FIG. 2. A group of vertical slot radiators make up the conformal array 60, distributed uniformly, approximately 0.6λ apart, over the faired surface. Each element contains a mixer, required filters and a radiating slot as described later in FIG. 3. Strip line techniques are used to distribute both reference and control signals. A corporate transmission line 61 is used for the former to establish equal phase-amplitude distribution of the reference signals; thus a single input port is provided between the array and reference oscillator 62. Control signals are individually carried from each mixer, through individual strip lines of equal length 63 to a common intermediate mixer assembly 64. These two sets of strip line conductors are carried in adjacent layers of strip line. Signals from the scaled scan controller 65 are routed through coaxial cables 66 to the intermediate mixer assembly.

Figure 3:
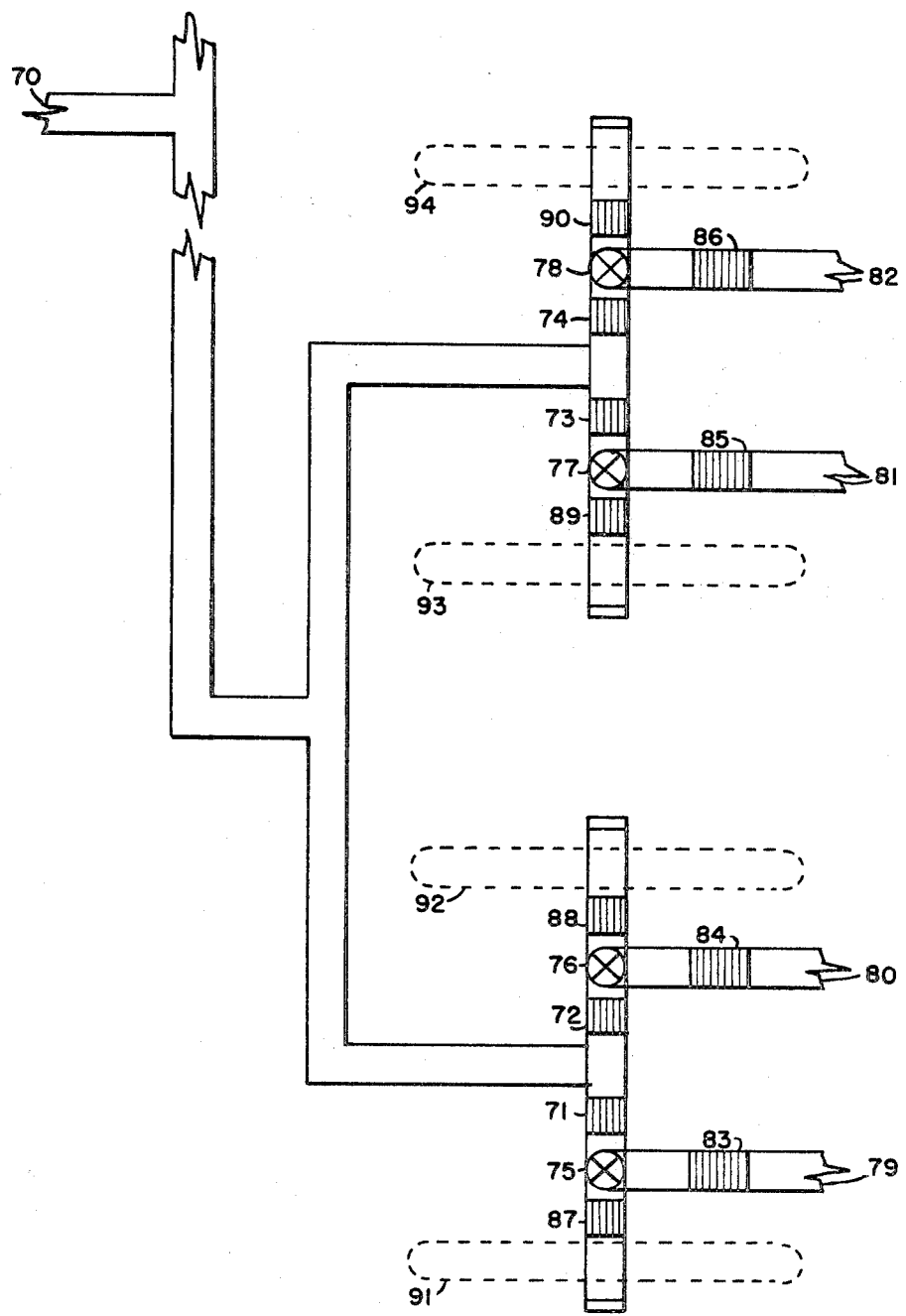
FIG. 3 is a drawing of the secondary mixer-radiator element assemblies.

FIG. 3 depicts the signal distribution system to a few typical elements. The reference signal enters the corporate structure at input 70 and is equal phase-amplitude distributed through highpass filters 71, 72, 73, and 74 to mixers 75, 76, 77, and 78. Control signals originating from corresponding elements within the control scan assembly enter at strip line conductors 79, 80, 81, and 82, pass through lowpass filters 83, 84, 85, and 86 to mixers 75, 76, 77, and 78 respectively. The upper side frequencies are passed through highpass filters 87, 88, 89, and 90 and are radiated from slots 91, 92, 93, and 94.

It is readily apparent to those skilled in the art that additional intermediate frequencies may be desired and that depending upon specific implementation involved, both upper and lower side frequencies can be employed. The type of radiators employed, transmission line type, filtering techniques, orientation of the control scan aperture relative to the primary transducer array, etc. are a matter of design choice chosen in accordance with the specific application involved. Changes, modifications and improvements to the above described embodiments of the invention may be made by those skilled in the art without departing from the spirit and scope of the invention. Therefore, I do not wish the patent to be limited in any manner inconsistant with the invention as defined in the appended claims:

I. Claim

1. A conformal array of radiating elements and a scaled scan control system wherein:

each element of the conformal array is fed signals from a mixer and side frequency filter;

each mixer has an input reference signal which is coherently received in all mixers;

each mixer has an input control signal derived from the scaled scan control system:

the scaled scan control system contains a scaled primary array of elements wherein the angular distribution of the scaled and conformal array components are made identical and operate at a wavelength scaled in direct accordance with the physical dimension scale employed;

furthermore, the scaled scan control system contains a control radiating aperture to collimate a beam which in turn illuminates the scaled primary array;

the radiation pattern of the control radiating aperture scans relative to the scaled array of radiating elements;

thus, producing signals within the element of the scaled primary array having the required characteristics to mix with coherent input reference signals at each corresponding element within the conformal array and produce side frequencies whose characteristics form the same relative directive characteristics within the conformal array pattern as observed by the scaled primary array within the scaled scan control system.

2. A system as described in claim 1 wherein electromagnetic radiation is involved in both the conformal array and the scaled scan control system.

3. A system as described in claim 1 wherein electromagnetic energy is radiated from the conformal array and acoustic energy is used within the scaled scan control system.

4. A system as described in claim 1 wherein acoustic energy is radiated from the conformal array and acoustic energy is used within the scaled scan control system.

5. A system as described in claim 1 wherein acoustic energy is radiated from the conformal array and electromagnetic energy is used within the scaled scan control system.

6. A system as described in claim 1 where sensing is accomplished by mechanically scanning the scaled primary array within the field of the control radiating aperture.

7. A system as described in claim 1 wherein the pattern of the control radiating aperture is scanned relative to the scaled primary array by either electrical or mechanical means.

8. A system as described in claim 1 wherein a transmitting mode of operation is used.

9. A system as described in claim 1 wherein a received mode of operation is used.

* * * * *